United States Patent Office 3,122,515
Patented Feb. 25, 1964

3,122,515
PROCESS FOR THE PREPARATION OF VINYL
CHLORIDE POLYMER FOAMS
Roland H. Peterson, St. Albans, and Walter K. Asbeck, South Charleston, W. Va., assignors to Union Carbide Corporation, a corporation of New York
No Drawing. Filed Dec. 5, 1960, Ser. No. 73,547
11 Claims. (Cl. 260—2.5)

The invention relates to a process for the preparation of foamed vinyl chloride polymers.

The preparation of foamed structures from thermoplastic polymers, particularly polystyrene, has been known for years. However, the techniques which are employed to foam polystyrene, which usually involve foaming the polymer from the molten state, cannot readily be adapted to the foaming of vinyl chloride polymers. The reason for this is that the thermal instability and high melt viscosity of vinyl chloride polymers makes it impractical to foam them from the molten state.

The techniques for foaming vinyl chloride polymers first made use of plastisol formulations in which there was either a chemical blowing agent dispersed or a gas such as carbon dioxide absorbed. Foaming was accomplished by heating the plastisol, which had to be formulated so that it foamed just before it gelled. This was difficult to do when an absorbed gas was employed as the blowing agent, and therefore made it more practical to use chemical blowing agents, which are expensive, often toxic, leave residual by-products in the formulation which impart poor color, and which are frequently excessively unstable which makes it difficult to control the foaming. Here again, the plastisol must be formulated so that gelation occurs immediately after foaming. Rigid non-plasticized vinyl chloride polymer foams have also been prepared by the use of chemical blowing agents, but again with many of the disadvantages which were outlined above.

The present invention provides a process for the preparation of vinyl chloride polymer foams which can be employed to prepare both rigid and flexible (plasticized) foams, which accomplishes the foaming without the use of chemical blowing agents, and which requires no critical formulating such as that required to achieve gelation immediately after foaming.

The process of the invention comprises the steps of dissolving in vinyl chloride polymer a member selected from the group consisting of an organic gas and a mixture of an organic liquid and a gas which is soluble in said organic liquid, and forming a foamable, solid, homogeneous mass of vinyl chloride polymer in which there is dissolved either an organic gas or an organic liquid/gas mixture; and heating the thus formed foamable, solid, homogeneous mass to a temperature in the range of from about 75° C. to about 125° C., and thereby causing said solid mass to expand and form a foamed structure.

In the process of the invention, a foamable, solid, homogeneous mass is prepared, which is subsequently foamed by heating at atmospheric pressure. The term "homogeneous" refers to the fact that the organic gas or organic liquid/gas mixture is dissolved in the vinyl chloride polymer, thereby forming a single-phased solid. There may be some bubbles that develop before the mass is heated, particularly when a very low-boiling gas is employed. However, the solid vinyl chloride polymer having dissolved therein either an organic gas or an organic liquid/gas mixture is, itself, homogeneous.

The vinyl chloride polymers which are employed in the invention, either singly or in admixture with one another, are the homopolymers of vinyl chloride and the copolymers which contain at least 50 weight percent of vinyl chloride copolymerized with vinyl acetate, vinyl alcohol, maleic anhydride, vinylidene chloride, and the like, said vinyl chloride polymers having reduced viscosities in the range of from about 0.2 to about 5, and preferably from about 0.5 to about 2.0. The reduced viscosity of a polymer is a measure of its molecular weight, and is obtained by dividing the specific viscosity by the concentration measured in grams of polymer per 100 milliliters of solvent at a given temperature. The specific viscosity is obtained by dividing the difference between the viscosity of the polymer solution and the viscosity of the solvent by the viscosity of the solvent. Unless otherwise indicated, the reduced viscosities of the vinyl chloride polymers employed herein were determined at a concentration of 0.2 gram of polymer per 100 milliliters of nitrobenzene at 20° C.

The preparation of the foamable, solid, homogeneous mass of vinyl chloride polymer having dissolved therein either an organic gas or an organic liquid/gas mixture can be accomplished by several different methods. Method I comprises the steps of subjecting a mixture of powdered vinyl chloride polymer and a liquified organic gas that is soluble in said polymer to a pressure sufficient to maintain said liquefied gas in the liquid state; heating said mixture while under said pressure to a temperature sufficient to fuse said mixture; cooling said mixture while still under said pressure; and then releasing the pressure and recovering the thus formed foamable, solid, homogeneous mass of vinyl chloride polymer having dissolved therein said organic gas.

Method I can be illustrated by a process comprising the following steps:

(a) Liquify an organic gas which has a boiling point below about 25° C., said organic gas being soluble in vinyl chloride polymer, (b) Thoroughly mix said liquified gas with powdered vinyl chloride polymer (vinyl chloride polymers are usually commercially produced in powdered form wherein the ultimate individual particles have a particle size falling in the range of from about 0.2 to about 80 microns in diameter, but said particles may be aggregated into larger particles of up to about 600 microns diameter), (c) Charge the mixture thus prepared to a mold, (d) Subject said mixture to a pressure sufficient to keep the liquified organic gas in the liquid state, (e) Heat said mixture to fuse it and thereby also cause the liquified organic gas to dissolve in the vinyl chloride polymer, (f) After fusion is complete, cool said mixture to about room temperature before releasing the pressure, and then recover the solid, homogeneous, foamable mass resulting therefrom.

The organic gases which can be employed in method I are those which have boiling points below about 25° C. at atmospheric pressure, and which are soluble in vinyl chloride polymers. Examples of such gases include methyl chloride, ethyl chloride, ethylene oxide, vinyl chloride, dimethyl ether, dichlorofluoromethane, acetaldehyde, and the like. It is preferred that these organic gases have boiling points above about —30° C. at atmospheric pressure, in order to have them more readily liquifiable. The preferred organic gas for use in method I is methyl chloride.

The proportion of organic gas that is mixed with the polymer can vary over a wide range. The lower limit is dependent upon several factors, the most important one being the least amount of gas which will cause the resin to foam. Since the foaming is accomplished at a temperature substantially below the melting temperature of the polymer, there must be sufficient organic gas present to serve as a softening agent for the polymer, so that the formation and growth of the individual bubbles in the foam will be permitted. The lower limit will vary, depending upon which organic gas is employed, but is normally approximately 10 weight percent of organic gas, based on the weight of the vinyl chloride polymer. Too much organic gas in the formulation will cause the mixture to be too soft and the foaming operation to be violent and uncontrolled, which would result in warped, ruptured, and blistered foams. In addition to the last said factor, the upper limit of gas depends upon the solubility limit, if any, of the organic gas in the polymer. The upper limit will vary, depending upon the particular gas employed, but generally will be about 150 weight percent of organic gas, based on the weight of the vinyl chloride polymer.

The pressure to which the mixture is subjected is that which is sufficient to maintain the liquified organic gas in the liquid state. The pressure needed will depend upon the particular organic gas employed, and the temperature to which the mixture is heated, but is normally in the range of from about 500 p.s.i. to about 3000 p.s.i.

The temperature at which the mixture of vinyl chloride polymer and liquified organic gas is fused depends, in part, on the nature and proportion of the particular formulation. A suitable temperature is from about 140° C. to about 200° C. Lower temperatures are employed when a relatively large proportion of liquified organic gas is present in the formulation, and conversely, higher temperatures are employed when the proportion of liquified gas is relatively low.

The time taken for the fusion step is dependent upon such factors as fusion temperature, nature and proportion of the components of the mixture, and the like, and can vary from about five to about twenty minutes. The thermal instability exhibited by all vinyl chloride polymers makes it advisable to keep the fusion step as short as possible.

After the mixture has been fused, and while still under pressure, it is cooled to about room temperature (25° C.) or below. The pressure is then released, and the solid, homogeneous, foamable mass of vinyl chloride polymer containing dissolved organic gas is recovered.

This mass can be foamed by heating, at atmospheric pressure, at a temperature of from about 75° C. to about 125° C. for from about five to about 30 minutes. A preferred method of foaming particularly for larger masses, comprises the use of dielectric heating of the foamable mass, either employing dielectric heating by itself or in combination with oven heating.

EXAMPLE I

This example is illustrative of method I.

Twenty-five grams of a powdered vinyl chloride homopolymer having a reduced viscosity of about 1.5 were thoroughly chilled in a large test tube immersed in pulverized Dry Ice. A quantity of dimethyl ether was condensed in a cold trap immersed in a slurry of Dry Ice and acetone. Ten grams of the liquified dimethyl ether were quickly poured into the chilled polymer, and thoroughly mixed with a spatula. From 15 to 20 grams of the resultant mix were transferred to a cylindrical steel mold of 1¾" I.D. which had also been chilled in Dry Ice so as to be at a temperature below the boiling point of the dimethyl ether. The mold was closed with a close-fitting piston, and then placed in a hydraulic press where the mixture was subjected to a pressure of about 2000 p.s.i. Steam at 90 p.s.i.g. was then circulated through the plates of the hydraulic press so as to heat the mold and its contents. After 10 minutes at 154–163° C., as indicated by a thermocouple sunk in a well in the base of the mold, cold water was substituted for the steam in the press plates, the mold cooled to about 10° C., the pressure released, and the fused plaque taken from the mold. The resultant plaque was light straw colored, perfectly homogeneous, flexible, and somewhat translucent. It was cut into quarters which were placed in a circulating hot air oven at 100° C. Foaming began with 2–3 minutes, starting at exposed corners and edges. Within 15 minutes, the pieces were fully expanded to yield very white, rigid foams of medium fine cell structure. Densities of the pieces ranged from 3.2 to 3.8 pounds per cubic foot. (The density of unexpanded vinyl chloride polymer is about 80–90 pounds per cubic foot.)

Method II comprises the steps of subjecting a mixture of a powdered vinyl chloride polymer, an organic liquid that is soluble in said polymer, and a liquified gas that is soluble in said organic liquid, to a pressure sufficient to maintain said gas in the liquid state; heating said mixture while under said pressure to a temperature sufficient to fuse said mixture; cooling said mixture while still under said pressure, and then releasing the pressure and recovering a foamable, solid, homogeneous mass of vinyl chloride polymer having dissolved therein said organic liquid and said gas.

Method II can be illustrated by a process which comprises the following steps:

(a) Prepare a mixture of a vinyl chloride polymer in powdered form and an organic liquid that is soluble in said polymer, (b) Liquify a gas that is soluble in said organic liquid, and then mix said liquified gas with the mixture of polymer and organic liquid, the order of mixing not being critical, (c) Charge the mixture thus prepared to a mold, (d) Subject said mixture in the mold to a pressure sufficient to maintain the liquified gas in a liquid state, (e) Heat the mixture in the mold to a temperature sufficient to fuse it, which thereby causes the organic liquid-liquified gas mixture to dissolve in the resin, (f) Cool the contents of the mold to about room temperature before releasing the pressure, and then recover the foamable, solid, homogeneous mass resulting therefrom.

The organic liquids which can be employed in method II are the normally-liquid organic materials which have boiling points in the range of from about 25° C. to about 130° C. at atmospheric pressure, and which are soluble in vinyl chloride polymers. Examples of such organic liquids include ketones such as acetone, methyl ethyl ketone, and methyl isobutyl ketone, chlorinated hydrocarbons such as methylene dichloride, ethylidene dichloride, ethylene dichloride, and isopropyl chloride, esters such as ethyl formate, methyl formate, ethyl acetate, and methyl acetate, various oxygenated materials such as 1,4-dioxane and tetrahydrofuran, acetals such as methylal, aromatic solvents such as benzene and toluene, and other solvents such as acetonitrile, and the like. The ketones are the preferred solvents, with acetone being most preferred.

The gases which can be employed in method II include all of the organic gases which can be employed in method I. In addition, gases can be employed which are not readily soluble in vinyl chloride polymer. The gases employed in method II are those which have boiling points below about 25° C., and which are soluble in the organic liquid employed in method II. Examples include hydrocarbons such as ethane, propane, ethylene, and propylene, various halogenated hydrocarbons such as ethyl fluoride, trichlorofluoromethane, difluorochloromethane, and 1,2-dichlorotetrafluoroethane. Preferably, the gases employed in method II are organic gases which have boiling points at atmospheric pressure above about −50° C.

The proportions of organic liquid and gas employed in method II are dependent upon many factors, and are therefore quite variable. The lower limit is about 10 weight percent, based on weight of vinyl chloride polymer, of organic liquid and gas combined. Since in method II, the gas need not be used to soften the vinyl chloride polymer to permit the formation and growth of bubbles, as little as about 2 weight percent, based on vinyl chloride polymer, of gas can be employed. When the gas employed is one that is soluble in the vinyl chloride polymer, and hence will soften the polymer to permit formation and growth of bubbles, the practical lower limit of organic liquid which need be employed is zero. Thus it is seen that method II is a modification of method I wherein some of the gas employed as a blowing agent is replaced by an organic liquid which is soluble in the vinyl chloride polymer, and wherein the use of this liquid enables a greater variety of gases to be employed as the blowing agent for the reason that the softening of the polymer to permit formation and growth of bubbles can be done by the liquid, and need not be done by the gas. The upper limit is about 150 weight percent, based on weight of vinyl chloride polymer, of organic liquid and gas combined. It is preferred that no more than 100 weight percent, based on weight of vinyl chloride polymer, of organic liquid be employed, with the remainder being the gas.

In brief summary of the proportions of the components employed in method II, the lower limit of gas which can be employed is about 2 weight percent, the lower limit of organic liquid and gas combined is about 10 weight percent, the upper limit of liquid and gas combined is about 150 weight percent, and the upper limit of liquid employed is preferably about 100 weight percent, all percentages being based on weight of vinyl chloride polymer.

The pressures, temperatures, and times employed in preparing the foamable, solid, homogeneous mass are the same for method II as for method I. Likewise, the time and temperature employed in the foaming step are the same as those employed in method I, except that additional time may be required to volatilize the organic liquid.

EXAMPLE II

This example is illustrative of method II.

Three grams of liquid propane condensed in a cold trap immersed in a Dry Ice-acetone slurry were mixed with 20 grams of chilled acetone contained in a test tube that was immersed in pulverized Dry Ice. This organic liquid/gas mixture was then poured into 30 grams of a chilled, powdered vinyl chloride homopolymer having a reduced viscosity of about 1.5. After thoroughly mixing the components, about 20 grams of the polymer/organic liquid/gas mixture were placed in a chilled 1¾ inch I.D. cylindrical steel mold. The mold was closed with a tightly fitting piston, and subjected to a pressure of about 2000 p.s.i. with a hydraulic press. Steam at 90 p.s.i. was then circulated through the press plates, and the contents of the mold were fused at 150–165° C. for 10 minutes, after which cold water was pased through the press plates to cool the contents of the mold to about 4° C. After cooling, the pressure was released and a homogeneous, clear, flexible plaque was recovered. The plaque was cut into quarters and eighths and then expanded to foam by heating for 10 minutes in a circulating air oven at 100° C. Foam density ranged from 0.9 to 1.3 pounds per cubic foot.

Method III for preparing the solid, foamable, homogeneous mass of vinyl chloride polymer having dissolved therein an organic liquid/gas mixture comprises the steps of subjecting a solid, homogeneous mass of vinyl chloride polymer having dissolved therein an organic liquid, to a pressurized atmosphere of a gas that is soluble in said organic liquid, for a period of time sufficient to cause said gas to dissolve in said solid, homogeneous mass; and recovering therefrom a foamable, soild, homogeneous mass having dissolved therein said organic liquid and said gas.

Method III is illustrated by a process comprising the following steps:

(a) Prepare a solid, homogeneous mass of vinyl chloride polymer having dissolved therein an organic liquid, by any convenient method such as by fusing and then cooling a mixture of vinyl chloride polymer and organic liquid, (b) Charge the solid, homogeneous mass to a pressure vessel, (c) Introduce, under pressure, into said vessel a gas which is soluble in the organic liquid employed, (d) Maintain the solid, homogeneous mass in said pressure vessel which contains a pressurized atmosphere of said gas for a period of time sufficient for said gas to diffuse throughout said solid, homogeneous mass, (e) Release the pressure, and recover the foamable, solid, homogeneous mass of vinyl chloride polymer having dissolved therein an organic liquid and a gas, which results therefrom.

The organic liquids which can be employed in method III are the normally-liquid organic materials which have boiling points in the range of from about 25° C. to about 130° C. at atmospheric pressure, and which are soluble in vinyl chloride polymers. Examples of such organic liquids are given above, in the discussion of method II.

The proportion of organic liquid employed in method III can vary from about 25 weight percent to about 150 weight percent, based on weight of vinyl chloride polymer.

The gases which are employed in method III are those having boiling points at atmospheric pressure below about 0° C., and which are soluble in the organic liquid employed. Included among the gases which can be employed are hydrocarbons such as methane, ethane, ethylene, propane, propylene, and the like, halogenated hydrocarbons such as methyl chloride, vinyl chloride, ethyl fluoride, difluorochloromethane, and the like, various oxygen-containing gases such as dimethyl ether, carbon dioxide, and the like, and inorganic gases such as nitrogen. Method III enables gases to be employed that are not readily liquifiable, such as carbon dioxide, methane, and nitrogen.

The gas pressure to which the solid homogeneous mass of vinyl chloride polymer having dissolved therein an organic liquid is subjected can vary from about 100 p.s.i. to about 1200 p.s.i. The preferred pressure is from about 300 p.s.i. to about 900 p.s.i. The temperature can be about room temperature, that is, from about 15° C. to about 40° C., although higher or lower temperatures can be employed if desired.

The amount of gas that is dissolved in method III can vary from about 1 weight percent to about 25 weight percent, based on weight of vinyl chloride polymer. The critical feature of method III is not the exact amount of gas which is dissolved, but rather is found in the need for continuing the gas diffusion and dissolving step for a period of time sufficient to cause the gas to permeate uniformly all the way through the solid, homogeneous mass.

The time required for diffusing and dissolving the gas in the solid, homogeneous mass depends upon such factors as nature and proportions of vinyl chloride polymer and organic liquid, nature and pressure of gas, ratio of surface area to volume of the solid, homogeneous mass, and the like, and therefore varies over a wide range. For example, a suitable time is found in the range of from about one hour to about 200 hours or more.

After the foamable, solid, homogeneous mass of vinyl chloride polymer having dissolved therein an organic liquid and a gas is recovered, the foaming operation is done by the same method as that described above in the discussion of method I.

EXAMPLE III

This example is illustrative of method III. One-hundred grams of a powdered vinyl chloride homopolymer having a reduced viscosity of about 1.5, and 100 grams of acetone were chilled separately in Dry Ice, then combined and thoroughly mixed. Although it is not necessary to cool ingredients in this case as in methods I and II since acetone is not a gas at room temperature, the same procedure was followed because the cold ingredients are more readily mixed. After warming to room temperature, approximately 15 grams of the mixture, now gelled, was transferred to a 1¾ inch cylindrical steel mold and fused at 150° C. under hydraulic pressure. The clear, flexible, straw-colored plaque was removed after cooling to room temperature, cut into quarters, and charged into a high pressure stainless steel bomb of 500 ml. capacity. The individual pieces were separated in the

EXAMPLES V–IX

These examples illustrate method I. In each experiment, 25 grams of a vinyl chloride homopolymer having a reduced viscosity of about 1.5 was mixed with a liquefied gas in the proportions indicated in Table I below. The experimental procedure was analogous to that employed in Example I.

Table I

| Example | Gas employed | Fusing conditions | Foaming conditions | Foam density, pounds per cubic foot | Remarks |
|---|---|---|---|---|---|
| V | 10 grams of ethyl chloride. | 10 minutes at 150° C. and 2,000 p.s.i. | 15 minutes at 100° C. | 3.2–3.9 | Medium fine cells, rather uniform. |
| VI | 11 grams of methyl chloride. | 10 minutes at 158–164° C. and 2,000 p.s.i. | ____do____ | 2.1–2.5 | Uniform, medium fine cells. |
| VII | 11 grams of vinyl chloride. | 10 minutes at 159–170° C. and 2,000 p.s.i. | 19 minutes at 100° C. | 2.5–5.6 | Do. |
| VIII | 12 grams of dichlorofluoromethane. | 14 minutes at 151–160° C. and 2,000 p.s.i. | 24 minutes at 100° C. | 2.6–3.2 | Uniform, fine cells. |
| IX | 10 grams of acetaldehyde. | 10 minutes at 150–156° C. and 2,000 p.s.i. | 20 minutes at 100° C. | 5.9–6.4 | Coarse and non-uniform cells. | bomb by cotton packing to permit equal exposure of all surfaces to the gas. The bomb was then pressurized with carbon dioxide gas at 600–900 p.s.i. at ambient temperatures for 68 hours, after which the bomb was blown down and the specimens removed. The plaque sections were not noticeably altered in appearance of "feel," but the cotton was wet with acetone indicating some loss of solvent. Two of the gas-charged specimens were heated in a 100° C. oven, whereupon they expanded greatly to form a vinyl resin foam. Initially, densities of these foams were 1.6 and 1.7 pounds per cubic foot, but they shrank considerably upon standing. The next day densities were 2.0 and 2.1 pounds per cubic foot and at the end of the month one specimen had increased to 4.5 pounds per cubic foot. Cell structures were medium fine to fine and quite uniform.

The invention has thus far been discussed and illustrated from the viewpoint of preparing rigid, non-plasticized foams. However, plasticized formulations can also be foamed by the process of the invention. Any of the methods, I, II, or III, described above, can be employed to prepare plasticized vinyl chloride polymer foams having up to about 50 weight percent plasticizer, based on polymer weight, in the formulation.

EXAMPLE IV

This example illustrates the preparation of a plasticized foam employing method III.

A solution of 12.5 grams of acetone and 12.5 grams of di(2-ethylhexyl) phthalate was thoroughly mixed with 25 grams of a vinyl chloride homopolymer having a reduced viscosity of about 1.5, and a portion of the resulting mixture fused at 156–171° C. for 10 minutes in a hydraulic press. After cooling, the clear foamed plaque was cut into quarters about 9 mm. thick and subjected to ethane gas at 500 p.s.i. as described in Example III. After 75 hours absorption, the ethane was blown down and a white, slightly expanded plaque removed from the bomb. Heating 15 minutes in a 100° C. oven caused this specimen to expand to form a very fine-celled elastic foam of 4.0 pounds per cubic foot density. After two weeks storage the foam increased to 4.8 pounds per cubic foot density due to shrinkage.

The utility of the foams produced by the process of the invention is quite wide. For example, rigid foams can be used as floats, thermal insulation, acoustical tile, structural members, and the like, while plasticized foams can be used as sponges, seating, padding, shock absorbers, and the like.

The following examples further illustrate various modifications of the invention.

EXAMPLE X

This example further illustrates method II.

Thirty grams of a vinyl chloride homopolymer having a reduced viscosity of about 1.5, 20 grams of acetone, and 3 grams of liquid propylene were mixed in the manner described in Example II and similarly fused for 10 minutes at 149–156° C. at about 2000 p.s.i. Quarters and eighths of the clear, flexible plaque expanded upon 10 minutes heating in a 100° C. circulating air oven. The resultant foam specimens ranged from 1.5–3.1 pounds per cubic foot in density, and possessed moderately fine and uniform cell structure.

EXAMPLE XI

This example further illustrates method III.

Twenty-five grams of a vinyl chloride homopolymer having a reduced viscosity of about 1.5 and 25 grams of acetone were mixed and fused for 10 minutes at 155–164° C. to form a 1¾ inch diameter plaque. A quarter section of the plaque was placed in each of four nickel pressure bombs of 22 ml. capacity in which a screen raised off the bottom served to permit exposure of all specimen surfaces to the gas. All four bombs were connected to a common manifold by means of which they were pressurized with ethane gas at 500 p.s.i. for approximately 50 hours. Temperature during absorption was 25–26° C. At the end of the absorption period the bombs were blown down and the sections removed. The treatment caused all the plaques to turn white except for a pale orange layer through their centers. When placed in a 100° C. oven, all quarters, expanded very smoothly and evenly, without warping, to form a vinyl foam of extreme fineness and uniformity. Expansion was virtually complete within 10–15 minutes after which it was possible to age the foam in the oven for several hours wtihout further increase in density. Minimum densities ranged from 2.0–2.5 pounds per cubic foot. Volume shrinkage of the foams after two days storage at room conditions was from 0 to 8 percent.

The structure of these foams was of exceptional fineness and uniformly surpassing that of any previously known foam. Structure was imperceptible to the unaided eye and specimens had all appearances of being perfectly solid. Magnification of 100–500× was necessary to reveal the individual cells which averaged about 2 microns in diameter over an estimated range of 1 to 10 microns.

EXAMPLE XII

This further illustrates method III.

After the manner described in Example III, 20 grams of a vinyl chloride homopolymer having a reduced viscosity of 1.5 and 20 grams of acetone were mixed and fused for 10 minutes at 150° C. to form a 1¾ inch diameter plaque. A quarter section of this plaque was placed on the screen in the 22 ml. bomb described in Example XI and subjected to 500 p.s.i. ethylene gas for 50 hours at 30–31° C. The bomb was then closed to confine the gas within it and immersed in an ice bath for an additional 4½ days. At the end of this period residual gas pressure (320 p.s.i.) was blown down and the still clear plaque removed which shortly began to whiten along its edges. The specimen was caused to foam by heating for 60 seconds in a 30 megacycle electric field of approximately 2000 volts. A very fine uniform foam of 2.1 pounds per cubic foot density was obtained.

EXAMPLE XIII

This example further illustrates method III.

After the manner described in Example III, 15 grams of a vinyl chloride homopolymer having a reduced viscosity of about 1.5 and 15 grams of acetone were mixed and fused for 10 minutes at 147–155° C. to yield a 1¾ inch diameter plaque. A 7 mm. thick quarter-section of the plaque was charged onto the screen of the 22 ml. bomb and pressurized for 78 hours with 500 p.s.i. nitrogen gas. Then the nitrogen was vented from the bomb and the still clear specimen removed which, however, shortly began to fill with small gas bubbles. Upon placing in a 100° C. oven the specimen expanded smoothly to form a very coarse cell foam of 1.4 pounds per cubic foot minimum density. The foam shrank considerably upon storage.

The remaining examples illustrate various modifications of the invention.

EXAMPLE XIV

A solution of 10 grams of acetone and 10 grams of n-butyl benzyl phthalate was thoroughly mixed with 20 grams of a vinyl chloride homopolymer having a reduced viscosity of 1.5. Fusion of the mixture for 10 minutes at 148–156° C. yielded a perfectly clear plaque which was cut into quarters about 9 mm. thick. One such section was subjected to 500 p.s.i. ethane pressure for 115 hours. Upon release of ethane pressure a white, considerably expanded plaque was obtained which was thoroughly expanded by heating in a 100° C. oven. Within 5 minutes a soft, uniform, and extremely fine-celled foam of 2.9 pounds per cubic foot density was obtained. The specimen was marred by some internal tearing. After two weeks storage, foam density had increased to 7.1 pounds per cubic foot because of shrinkage.

EXAMPLES XV–XIX

Liquified methyl chloride was thoroughly hand-mixed into each of several vinyl chloride polymers. Before mixing, the polymers were cooled in Dry Ice. The proportions of the gas and polymer are tabulated in Table II below. About 21 grams of the mixtures then were fused in a closed mold under pressure at the temperatures indicated, as in Example I. The resultant plaques were caused to expand by exposure to a 2000 volt-30 megacycle electric field, followed by placement in a 90° C. oven.

Table II
FOAMING OF VARIOUS VINYL CHLORIDE POLYMERS WITH METHYL CHLORIDE

| Example | Vinyl chloride polymer | | Gas (gm.) | Fusion 10 min., °C. | Expansion | | Foam | |
|---|---|---|---|---|---|---|---|---|
| | Type | Gm. | | | R.F. (sec.) | Oven (min.) | lbs./ft.³ | Structure |
| XV | Polymer A¹ | 25 | 7.5 | 140 | 45 | 5 | 2.3 | Very fine. |
| XVI | Polymer B² | 25 | 10 | 140 | 45 | 5 | 2.8 | Do. |
| XVII | Polymer C³ | 25 | 10 | 150 | 0 | 15 | 2.2, 1.9 | Med. fine. |
| XVIII | Polymer D⁴ | 25 | 7.5 | 130 | 45 | 5 | 2.3 | Very fine. |
| XIX | Polymer E⁵ | 25 | 3.8 | 130 | 120 | 3 | 2.6 | Med. fine. |

¹ A bulk polymerized vinyl chloride homopolymer of 0.95 reduced viscosity.
² A suspension polymerized vinyl chloride homopolymer of 0.92 reduced viscosity.
³ An emulsion polymerized copolymer containing about 90 percent vinyl chloride and 10 percent vinyl acetate and of 1.25 reduced viscosity.
⁴ A bulk polymerized copolymer containing about 97.5 percent vinyl chloride and 2.5 percent vinyl acetate and of 1.05 reduced viscosity.
⁵ A solution polymerized copolymer containing about 90 percent vinyl chloride and 10 percent vinyl acetate and of 0.88 reduced viscosity.

EXAMPLES XX–XXXV

Foams were prepared from 25 grams of a vinyl chloride homopolymer having a reduced viscosity of about 1.5, using the proportions of gas and solvent indicated in Table III below. Examples XX through XXIII were prepared in a manner analogous to Example III, and Examples XXIV through XXXV were prepared in a manner analogous to Example II.

Table III
FOAMING OF VINYL CHLORIDE POLYMER WITH VARIOUS SOLVENTS

| Example | Grams of Solvent | Grams of Gas | Density ¹ |
|---|---|---|---|
| XX | 28 Acetone | Carbon dioxide | 3.5 |
| XXI | 25 Methyl ethyl ketone | do | 1.8 |
| XXII | 25 Methyl isobutyl ketone | do | 4.4 |
| XXIII | 26 Tetrahydrofuran | do | 3.1 |
| XXIV | 10 1,4 Dioxane | 2.5 Propylene | 3.0 |
| XXV | 10 Methyl formate | do | 1.9 |
| XXVI | 10 Ethyl formate | do | 3.3 |
| XXVII | 10 Methyl acetate | do | 4.6 |
| XXVIII | 10 Ethyl acetate | do | 3.0 |
| XXIX | 10 Methylene chloride | do | 2.1 |
| XXX | 10 Ethylidene chloride | do | 3.5 |
| XXXI | 10 Ethylene chloride | do | 4.3 |
| XXXII | 10 Isopropyl chloride | 2.5 Dimethyl ether | 3.1 |
| XXXIII | 10 Methylal | do | 4.3 |
| XXXIV | 10 Acetonitrile | 2.5 Propylene | 2.8 |
| XXXV | 10 Benzene | do | 3.2 |

¹ By way of illustration of foam quality—not necessarily a minimum or comparative value. Lower density foams have been obtained with other acetone compositions, for example.

EXAMPLES XXXVI–XXXIX

A vinyl chloride homopolymer having a reduced viscosity of 1.5 and acetone at room temperature were mixed in the various proportions indicated in the following tabulation. Portions of these mixes were then charged into the pressure mold and fused in the usual manner for the times and temperatures also indicated in the tabulation. Quarter sections of the plaques obtained after such fusion were then placed in pressure bombs and exposed to ethane gas at 500 p.s.i. and 25–27° C. for the length of time indicated in the tabulation, after which the plaques were removed and expanded in a 100° C. oven. It can be seen in the tabulation that higher density foams were obtained with lower solvent concentrations.

Table IV

| Example | Polymer (gm.) | Acetone (gm.) | Fusion Conditions (min. at °C.) | Absorption Time (hr.) | Foam Density (lbs./cu. ft.) |
|---|---|---|---|---|---|
| XXXVI | 20 | 5 | 10; 150–55 | 141 | 11.2 |
| XXXVII | 20 | 10 | 10; 148–59 | 144 | 7.2 |
| XXXVIII | 15 | 15 | 10; 150–63 | 119 | 2.2 |
| XXXIX | 10 | 15 | 12; 154–66 | 90 | 2.3 |

EXAMPLE XL

One hundred grams of a vinyl chloride homopolymer having a reduced viscosity of about 1.5 and 5 grams of basic lead phosphite were blended together in a pony mixer and 40 grams of this mixture were mixed with 20 grams of acetone at Dry Ice temperatures. In warming to room temperature the mixture set to a gel which was two-roll milled on a cold mill to disperse the heat stabilizer. A portion of this mixture was charged into a pressure mold and fused under pressure at 150° C. as described previously, and the cooled plaque cut into quarters. One of these quarters was placed into a bomb and subjected to carbon dioxide gas at 450–600 p.s.i. and 24–27° C. for 24 hours. The plaque was then expanded in a 93° C. oven to yield a moderately fine celled foam of rather uniform structure. The density of the foam was 6.3 pounds per cubic foot.

EXAMPLE XLI

A cold uniform mixture of 50 grams of a vinyl chloride homopolymer having a reduced viscosity of about 1.5 and 30 grams liquid methyl chloride was packed into the barrel of a one oz. Van Dorn injection molder and kept under about 1200 p.s.i. pressure by means of a hydraulically driven piston. The entire barrel and piston were previously chilled in Dry Ice to prevent boiling of the liquid gas during charging. The 1/4" circular orifice of the nozzle was closed with a hemispherical brass plug mechanically held in place. The barrel was then electrically heated to fuse the composition for 5 minutes at 140° C. and then allowed to cool spontaneously to 100° C. Upon now removing the brass plug from the orifice the composition was rapidly extruded as a foam which broke into several pieces. The largest of these was a rod of 18 inches long and 1⅜" in diameter. The foam was extremely fine in structure, soft and somewhat fibrous, and of 2.1 pounds per cubic foot density.

In this example it is pointed out that expansion is accomplished simultaneously with release of the pressure serving to keep the fused composition in a homogeneous, i.e. unexpanded, condition. This has the advantage of eliminating the necessity for reheating compositions cooled to room temperature and permits attainment of greater uniformity of temperature in the composition at the moment of expansion.

What is claimed is:

1. A process for the preparation of vinyl chloride polymer foams which comprises the steps of:
    (a) subjecting an admixture comprising a liquified organic gas that has a boiling point below about 25° C. and a composition selected from the group consisting of powdered vinyl chloride polymer and a mixture of powdered vinyl chloride polymer and organic liquid that is soluble in said vinyl chloride polymer and has a boiling point in the range of from about 25° C. to about 130° C., said liquified organic gas being soluble in said composition, to a pressure sufficient to maintain said liquified organic gas in the liquid state;
    (b) heating said admixture while under said pressure to a temperature and for a period of time sufficient to fuse said admixture;
    (c) cooling said admixture while still under said pressure;
    (d) releasing said pressure and recovering the thus formed foamable, solid, homogeneous mass; and
    (e) heating said foamable, solid, homogeneous mass to a temperature in the range of from about 75° C. to about 125° C. for a period of time sufficient to cause said mass to expand and form a foamed structure.

2. A process for the preparation of vinyl chloride polymer foams which comprises the steps of:
    (a) subjecting an admixture comprising a liquified organic gas that has a boiling point below about 25° C. and a composition selected from the group consisting of powdered vinyl chloride polymer and a mixture of powdered vinyl chloride polymer and organic liquid that is soluble in said vinyl chloride polymer and has a boiling point in the range of from about 25° C. to about 130° C., said liquified organic gas being soluble in said composition, to a pressure of from about 500 to about 3000 pounds per square inch;
    (b) heating said admixture while under said pressure to a temperature of from about 140° C. to about 200° C. for from about 5 to about 20 minutes;
    (c) cooling said admixture while still under said pressure;
    (d) releasing said pressure and recovering the thus formed foamable, solid, homogeneous mass; and
    (e) heating said foamable, solid, homogeneous mass to a temperature in the range of from about 75° C. to about 125° C. for from about 5 to about 30 minutes.

3. A process for the preparation of vinyl chloride polymer foams which comprises the steps of:
    (a) subjecting a mixture of powdered vinyl chloride polymer and a liquified organic gas that is soluble in said polymer and which has a boiling point below about 25° C., to a pressure of from about 500 to about 3000 pounds per square inch;
    (b) heating said mixture while under said pressure to a temperature of from about 140° C. to about 200° C. for from about 5 to about 20 minutes;
    (c) cooling said mixture while still under said pressure;
    (d) releasing said pressure and recovering the thus formed foamable, solid, homogeneous mass; and
    (e) heating said foamable, solid homogeneous mass to a temperature in the range of from about 75° C. to about 125° C. for from about 5 to about 30 minutes.

4. The process of claim 3 wherein said liquified organic gas is methyl chloride.

5. A process for the preparation of vinyl chloride polymer foams which comprises the steps of:
    (a) subjecting a mixture of powdered vinyl chloride polymer, organic liquid that is soluble in said polymer and which has a boiling point in the range of from about 25° C. to about 130° C., and a liquified organic gas that is soluble in said organic liquid and which has a boiling point below about 25° C., to a pressure of from about 500 to about 3000 pounds per square inch;
    (b) heating said mixture while under said pressure to a temperature of from about 140° C. to about 200° C. for from about 5 to about 20 minutes;
    (c) cooling said mixture while still under said pressure;
    (d) releasing said pressure and recovering the thus formed foamable, solid, homogeneous mass; and
    (e) heating said foamable, solid, homogeneous mass to a temperature of from about 75° C. to about 125° C. for from about 5 to about 30 minutes.

6. The process of claim 5 wherein said organic liquid is acetone.

7. The process of claim 5 wherein said organic liquid is acetone and wherein said organic gas is propane.

8. A process for the preparation of vinyl chloride polymer foams which comprises the steps of:
    (a) subjecting a solid, homogeneous mass of vinyl chloride polymer having dissolved therein an organic liquid which has a boiling point in the range of from about 25° C. to about 130° C., to a pressurized atmosphere of from about 100 to about 1200 pounds per square inch of a gas having a boiling point below about 0° C., said gas being soluble in said organic liquid, for from about 1 hour to about 200 hours;

(b) releasing the pressure and recovering therefrom the thus formed foamable, solid, homogeneous mass; and (c) heating said mass to a temperature of from about 75° C. to about 125° C. for from about 5 to about 30 minutes.

9. The process of claim 8 wherein said organic liquid is acetone.

10. The process of claim 8 wherein said organic liquid is acetone and wherein said gas is ethane.

11. A process for the preparation of vinyl chloride polymer foams which comprises the steps of (a) subjecting an admixture comprising a liquified organic gas that has a boiling point below about 25° C. and a composition selected from the group consisting of powdered vinyl chloride polymer and a mixture of powdered vinyl chloride polymer and organic liquid that is soluble in said vinyl chloride polymer and which has a boiling point in the range of from about 25° C. to about 130° C., said liquified organic gas being soluble in said composition, to a pressure of from about 500 to about 3000 pounds per square inch;

(b) heating said admixture while under said pressure to a temperature of from about 140° C. to about 200° C. for from about 5 to about 20 minutes;

(c) cooling said admixture while still under said pressure to a temperature in the range of from about 75° C. to about 125° C., thereby forming a foamable, solid, homogeneous mass; and (d) releasing said pressure thereby causing said foamable, solid, homogeneous mass to expand and form a foamed structure.

References Cited in the file of this patent
UNITED STATES PATENTS

| | | |
|---|---|---|
| 2,409,910 | Stober | Oct. 22, 1946 |
| 2,576,977 | Stober | Dec. 4, 1951 |
| 2,681,321 | Stastny | June 15, 1954 |
| 3,026,272 | Rubens et al. | Mar. 20, 1962 |
| 3,026,273 | Engles | Mar. 20, 1962 |
| 3,026,274 | McMillan et al. | Mar. 20, 1962 |

FOREIGN PATENTS

| | | |
|---|---|---|
| 575,012 | Canada | Apr. 28, 1959 |
| 575,013 | Canada | Apr. 28, 1959 |

OTHER REFERENCES

Modern Plastics, issue No. 9, pages 97, 98, 100 and 102, May 1950.

Rubber Age, volume 67, pages 553–560, August 1950.